United States Patent [19]
Yasue et al.

[11] Patent Number: 5,842,951
[45] Date of Patent: Dec. 1, 1998

[54] SPEED CHANGE CONTROL SYSTEM FOR AUTOMATIC TRANSMISSION

[75] Inventors: Hideki Yasue, Toyota; Hiromichi Kumura, Okazaki, both of Japan

[73] Assignee: Toyota Jidoshi Kabushiki Kaisha, Toyota, Japan

[21] Appl. No.: 847,456

[22] Filed: Apr. 23, 1997

[30] Foreign Application Priority Data

Apr. 25, 1996 [JP] Japan ..................................... 8-129172

[51] Int. Cl.$^6$ .................................................. F16H 61/00
[52] U.S. Cl. .......................................................... 477/149
[58] Field of Search ..................................... 477/148, 149

[56] References Cited

U.S. PATENT DOCUMENTS

| | | | |
|---|---|---|---|
| 4,796,490 | 1/1989 | Butts et al. | 477/149 |
| 5,029,494 | 7/1991 | Lentz et al | 477/149 |
| 5,085,105 | 2/1992 | Wakahara et al. | 477/149 |

FOREIGN PATENT DOCUMENTS

62-288759  12/1987  Japan .
4-29668   1/1992   Japan .

Primary Examiner—Dirk Wright
Attorney, Agent, or Firm—Oblon, Spivak, McClelland, Maier & Neustadt, P.C.

[57] ABSTRACT

A speed change control system for an automatic transmission for making a speed change of the automatic transmission by applying/releasing frictional engagement elements and for controlling a line pressure, to be fed to the frictional engagement elements, to a pressure according to a throttle opening. The speed change control system detects a downshift of the automatic transmission with the throttle opening being increased, to control the line pressure to a level lower than that according to the throttle opening, if the downshift is detected. As a result, the torque transmission capacities of the frictional engagement elements, even if they are of the hydraulic type in which they are applied at the downshift, can be preventing from increasing during the speed change, thereby to improve the shift shock at the downshift.

8 Claims, 5 Drawing Sheets

| SHIFT | GEAR STAGE | C1 | C2 | C3 | B1 | B2 | B3 | F1 | F2 |
|---|---|---|---|---|---|---|---|---|---|
| P | | × | × | × | × | × | ○ | × | × |
| R | | × | ○ | × | × | ○ | ○ | × | × |
| N | | × | × | × | × | × | ○ | × | × |
| D | 1ST | ○ | × | × | × | × | ○ | △ | △ |
| D | 2ND | ○ | × | × | ○ | × | ○ | × | △ |
| D | 3RD | ○ | ○ | × | × | × | ○ | × | △ |
| D | 4TH | ○ | ○ | ○ | × | × | × | × | × |
| 2 | 1ST | ○ | × | × | × | × | ○ | △ | △ |
| 2 | 2ND | ○ | × | × | ○ | × | ○ | × | △ |
| L | 1ST | ○ | × | × | × | ○ | ○ | △ | △ |

SPEED CHANGE CONTROL SYSTEM FOR AUTOMATIC TRANSMISSION

BACKGROUND OF THE INVENTION

1. Field of the Invention

The present invention relates to a speed change control system for an automatic transmission of a vehicle and, more particularly, to a system for controlling a downshift.

2. Related Art

In the vehicular automatic transmission, as well known in the art, the speed change is made by applying/releasing frictional engagement elements to be actuated by an oil pressure control unit. As a result, the change in the output torque of the automatic transmission may be influenced by the manner how to apply/release the frictional engagement elements thereby to increase the shift shock. If the frictional engagement elements to be applied for achieving a higher speed gear stage are abruptly given torque capacities when an upshift of the automatic transmission is to be executed in the power ON state with the accelerator being depressed, the output torque is abruptly changed to cause the shift shock.

Thus, the control is made to change the output torque smoothly by controlling a line pressure, i.e., an oil pressure to be applied to the frictional engagement elements to be applied at the upshift. In the invention disclosed in JPA-4-296668, for example, the shift shock is lightened by lowering the line pressure simultaneously with the start of an inertia phase at the upshift to gently increase the torque capacities of the frictional engagement element for achieving the higher speed gear stage.

As described above, the upshift is achieved by applying the frictional engagement elements (e.g, clutches) for setting the higher speed gear stage to give them the torque capacities. The change in the torque capacities of the frictional engagement elements, i.e, the change in the application pressure exerts influences upon the change in the output torque of the automatic transmission. In the invention disclosed in the above-specified publication, therefore, the line pressure itself or the source pressure for applying the frictional engagement elements in the inertia phase is dropped to smoothen the rotational change in the rotary elements of the automatic transmission.

On the other hand, a downshift is a shift for increasing the input RPM and is started and executed by releasing the frictional engagement element for achieving a higher speed gear stage, to cause the rotational change. As a result, the advancing situation of the shift or the change in the output torque is influenced by the degree of reducing the torque capacities of the frictional engagement elements for achieving the higher speed gear stage, i.e., by the manner to lower the application pressure, so that the shift shock can be reduced by controlling the manner to relieve the pressure from the frictional engagement elements achieving the higher speed gear stage.

In the case of the downshift in the power ON state, therefore, the line pressure will exert no influence upon the drop in the application pressures of the frictional engagement elements to be released. As a result, no margin of the control of the line pressure is intrinsically allowed for controlling the applied/released states of the frictional engagement elements, as required for the speed change.

However, when the downshift in the power ON state, e.g., the speed change from the fourth speed to the third speed is to be effected such that not the frictional engagement element for the fourth speed but a one-way clutch and a frictional engagement element for the third speed in parallel with the one-way clutch to transmit the torque, the output torque is drastically and abruptly lowered if the third-speed frictional engagement element has a torque capacity more than necessary before the input RPM reaches the synchronous value for the lower gear stage.

If this drop in the output torque occurs in the course of a speed change, the abrupt drop in the drive force may be felt by the driver of the vehicle to cause the shift shock or deteriorate the riding comfort.

This problem can be solved by making design changes in which the clearance between the frictional faces of the frictional engagement elements for the third speed is enlarged or in which the application orifice in an oil pressure circuit for applying the line pressure to the third speed frictional engagement elements, to suppress the frictional engagement elements for the third speed from having torques more than necessary in the course of the speed change.

If this designing solution is adopted, however, the applications of the frictional engagement elements for the third-speed may be delayed at the downshift from the fourth speed to the third speed to increase the time lag as a whole thereby to deteriorate the drivability. Especially when an overdrive switch is turned OFF in the state of setting the fourth speed for the driver to acquire the engine braking effect at the third speed, it is desirable that the downshift from the fourth speed to the third speed be quickly effected. When the aforementioned solution means is adopted, however, it is made difficult by the increase in the time lag to satisfy that desire.

SUMMARY OF THE INVENTION

A main object of the present invention is to execute a downshift in an automatic transmission with an output of a prime mover being augmented, such that the output torque may not abruptly change.

Another object of the present invention is execute the downshift without causing any delay in a speed change.

In order to achieve these objects, according to the present invention, there is provided means for setting a line pressure at a downshift to a level lower than that of a pressure according to the load upon a prime mover such as a throttle opening. The time period for the line pressure to be kept at the low level is preferably continued immediately before the end of the downshift.

According to a speed change control system of the present invention, therefore, the downshift of the automatic transmission is started by releasing a frictional engagement element, as having set a higher speed gear shift, and by applying a frictional engagement element for setting a lower speed gear stage. Here, the line pressure to be fed to the frictional engagement element for setting the lower speed gear stage is controlled to a level lower than that of the pressure set according to the output of the prime mover, so that the frictional engagement element for setting the lower speed gear stage is prevented from having a torque capacity larger than a predetermined value before the input RPM of the automatic transmission reaches a synchronous RPM to the lower speed. As a result, the fluctuation in the output torque in the course of the speed change can be made gentle to lighten the shift shock thereby to stabilize the drive force and improve the riding comfort.

Since the line pressure can be controlled according to the output of the prime mover, moreover, it can be set to a level according to the other running conditions, if the downshift is effected under the running conditions, so that the time lag at the downshift under the conditions can be prevented.

In the present invention, still moreover, the line pressure to be fed to the frictional engagement element for setting the lower speed gear stage restores the line pressure at the level according to the load of the prime mover such as the throttle opening at the end of the downshift, so that the frictional engagement element for achieving the lower speed gear stage is given a torque capacity according to the load at the end of the downshift. As a result, the torque capacity of the frictional engagement element after the downshift can be retained sufficiently for preventing the slippage and for improving the durability of the frictional engagement element.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENT

One embodiment of the present invention will be specifically described with reference to FIG. 1. At the output side of an engine exemplifying the prime mover, there is arranged a Transaxle B, and these engine A and Transaxle B are so transversely mounted on a vehicle that their center axis is directed widthwise of the vehicle. In the Transaxle B, there are assembled an automatic transmission C and a final reduction mechanism D.

In the automatic transmission C, an input shaft 4 is connected to a turbine runner 3 of a torque converter 2 which is equipped with a lockup clutch 1. On the axis common to that of the input shaft 4, there are arrayed a first planetary gear mechanism 5 and a second planetary gear mechanism 6. These planetary gear mechanisms 5 and 6 are of the single pinion type individually having three components: sun gears 7 and 8, ring gears 9 and 10 made of internal gears arranged concentrically with the sun gears 7 and 8, and carriers 11 and 12 retaining pinions meshing with those sun gears 7 and 8 and ring gears 9 and 10.

Figure 1:
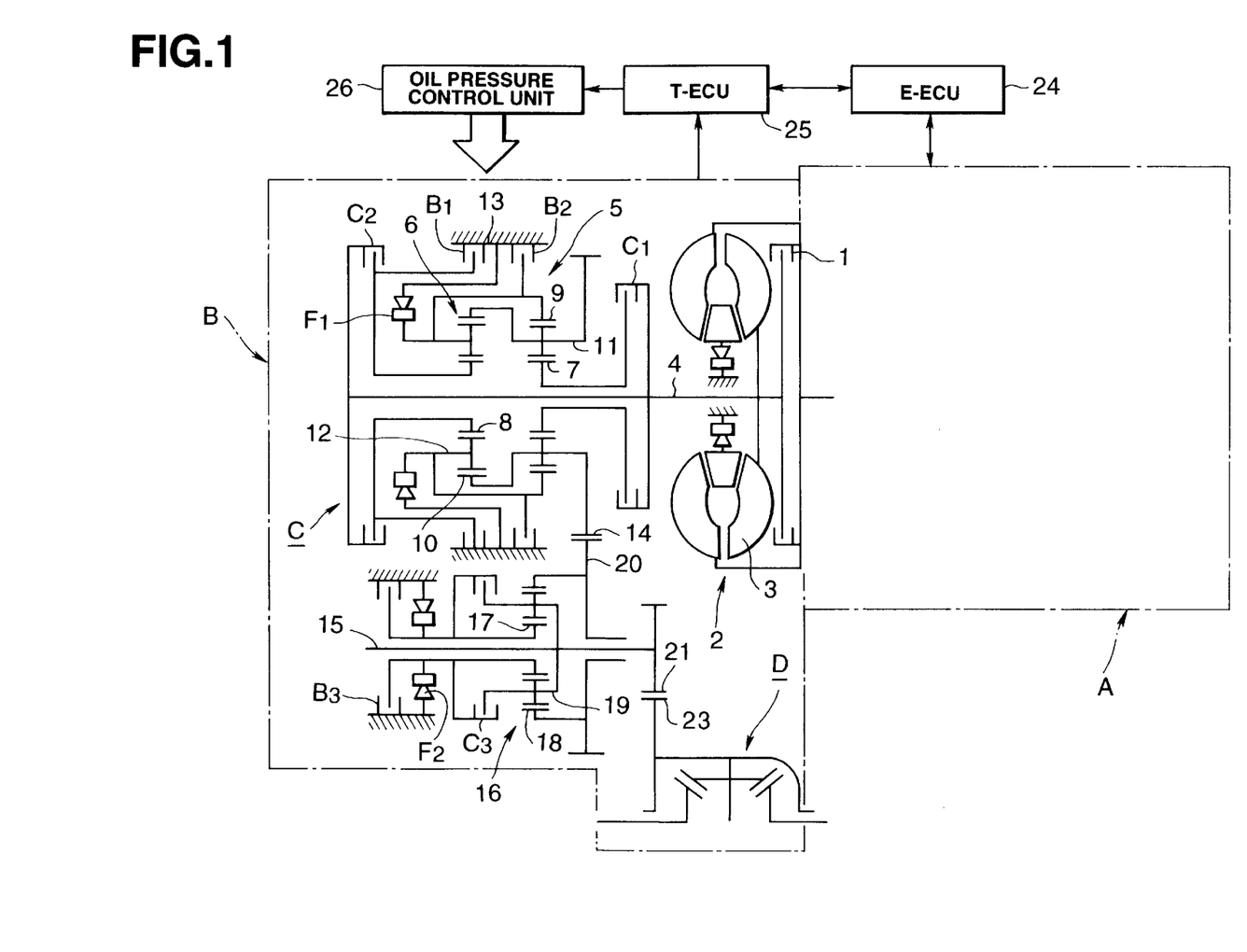
FIG. 1 is a conceptional diagram showing a schematic construction of a speed change control system for an automatic transmission according to the present invention.

Of these planetary gear mechanisms 5 and 6, the carrier 11 of the first planetary gear mechanism 5, as located at the righthand side of FIG. 1, and the ring gear 10 of the second planetary gear mechanism 6, as located at the lefthand side, are connected to rotate together. The ring gear 9 of the first planetary gear mechanism 5 and the carrier 12 of the second planetary gear mechanism 6 are also connected to rotate together.

Since the carriers 11 and 12 and the ring gears 9 and 10 of those first and second planetary gear mechanisms 5 and 6 are connected, as described above, there are provided totally four rotary elements: the integrated carrier 11 and ring gear 10; the integrated carrier 12 and ring gear 9; and the two sun gears 7 and 8.

There is provided a first clutch C1 for connecting the input shaft 4 selectively to one of the four rotary elements, that is, the sun gear 7 of the first planetary gear mechanism 5. There is also provided a second clutch C2 for connecting the input shaft 4 selectively to the sun gear 8 of the second planetary gear mechanism 6.

Between the sun gear 8 of the second planetary gear mechanism 6 and the casing 13 of the automatic transmission C, on the other hand, there is interposed a first brake acting as brake means for stopping the rotation of the sun gear 8 selectively. Between the ring gear 9 of the first planetary gear mechanism 5 and the carrier 12 of the second planetary gear mechanism 6, as integrated together, and the casing 13, moreover, there is interposed a second brake B2 for stopping the rotations of the ring gear 9 and the carrier 12 selectively. Moreover, a one-way clutch F1 is arranged in parallel with the second brake 2.

To the remaining rotary elements, that is, the carrier 11 of the first planetary gear mechanism 5 and the ring gear 10 of the second planetary gear mechanism 6, as integrated together, there is connected a counter drive gear 14.

Here will be described the array of the aforementioned components. The first planetary gear mechanism 5 and the second planetary gear mechanism 6 are arranged adjacent to each other. The first clutch C1 is arranged between the first planetary gear mechanism 5 and the torque converter 2, and the counter drive gear 14 is arranged between the first clutch C1 and the first planetary gear mechanism 5. On the other hand, the second clutch C2 is arranged at the other side of the first clutch C1 across the individual planetary gear mechanisms 5 and 6, and the one-way clutch F1 is arranged between the second clutch C2 and the second planetary gear mechanism 6.

In parallel with the aforementioned input shaft 4, that is, in parallel with the center axis of the individual planetary gear mechanisms 5 and 6, there is arranged a counter shaft 15. On the axis common to that of this counter shaft 15, there is arranged a third planetary gear mechanism 16. This third planetary gear mechanism 16 is of the single pinion type having three components: a sun gear 17; a ring gear 18 made of an internal gear arranged concentrically with the sun gear 17; and a carrier 19 retaining a pinion meshing with those sun gear 17 and ring gear 18.

Adjacent to this third planetary gear mechanism, there is so arranged a counter driven gear 20 as is arranged rotatably and on a common axis with respect to the counter shaft 15. The counter driven gear 20 is in meshing engagement with the counter drive gear 14. Moreover, the ring gear 18 of the third planetary gear mechanism 16 is connected rotatably together to the counter driven gear 20, and the carrier 19 is connected rotatably together to the counter shaft 15.

Between the sun gear 17 and the carrier 19 of the three components of the third planetary gear mechanism, there is interposed a third clutch C3 for connecting the two selectively. Between the sun gear 17 and the casing 13, on the other hand, there is arranged a third brake B3 for stopping the rotation of the sun gear 17 selectively. Between the sun gear 17 and the casing 13, moreover, there is arranged a one-way clutch F2 which has a parallel relation to the third brake B3.

To the end portion of the counter shaft 15, as located at the righthand side of FIG. 1, i.e., at the side of the torque converter 2, moreover, there is fixed an output gear 21 which is in meshing engagement with a ring gear 23 of the final reduction mechanism D.

Figure 2:
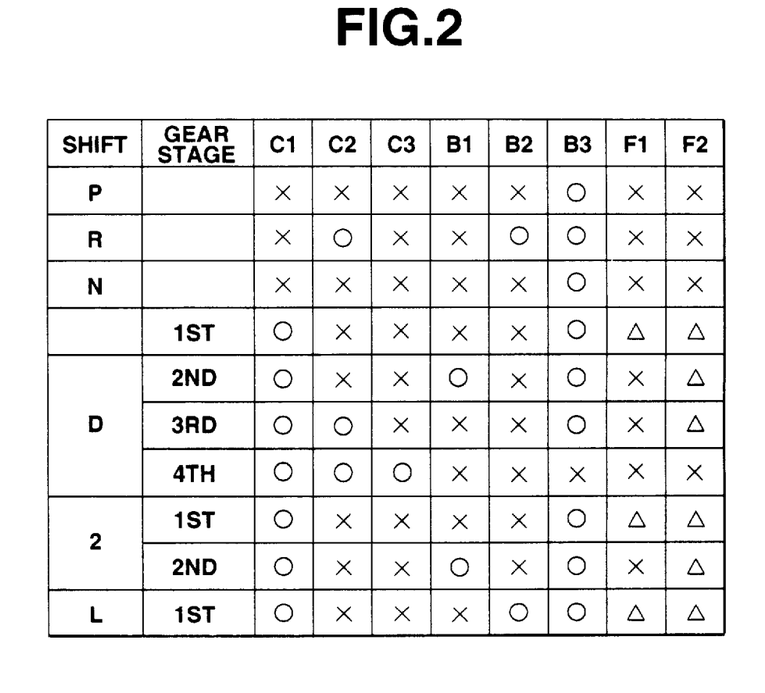
FIG. 2 is a clutch/brake application chart tabulating the applied/released actions of frictional engagement elements for setting one of gear stages of the automatic transmission of FIG. 1.

The automatic transmission C thus constructed can set four forward and one reverse gear stages, and the applied/released states of the frictional engagement elements for the gear state setting are as tabulated in FIG. 2. In FIG. 2: symbols ○ indicate the applied state; symbols X indicate the released state; and symbols Δ indicate the applied state to be taken only at the drive time. Moreover: letter P indicates a parking range; letter N a neutral range; letter R a reverse range; letter D a drive range; numeral "2" a second range allowing an upshift to a second speed; and letter L a low range for setting a first speed for establishing an engine braking force. One of these ranges is selected by operating the (not-shown) shift lever.

Here will be described control lines for the engine A and the automatic transmission C. The fuel injection rate and the ignition timing of the engine A are controlled by an engine electronic control unit (E-ECU) 24. This electronic control unit 24 is composed mainly of a central processing unit (CPU), a memory unit (RAM and ROM) and an input/output interface. To this electronic control unit 24, there are inputted a variety of signals as data for the controls, such as the engine RPM, the flow rate of intake air, the temperature of intake air, the throttle opening, the water temperature of the engine, and a signal from the brake switch.

With the engine electronic control unit 24, moreover, there is so connected an automatic transmission electronic control unit 25 for controlling the automatic transmission C that they can communicate the data with each other. This automatic transmission electronic control unit 25 is composed mainly of a central processing unit (CPU), a memory unit (RAM and ROM) and an input/output interface. To this electronic control unit 25, there are inputted a shift position signal, a pattern select switch signal, an overdrive switch signal, a manual shift switch signal, an output RPM signal and a turbine RPM signal.

Moreover, the automatic transmission electronic control unit 25 is connected with an oil pressure control unit 26 for controlling the actions of the frictional engagement elements which are arrayed in the automatic transmission C, so that the gear stages of the automatic transmission are controlled and switched in response to the control signals to be outputted from the automatic transmission electronic control unit 25 to the oil pressure control unit 26.

Specifically, the automatic transmission electronic control unit 25 is stored in advance with a shift pattern to control the gear stages of the automatic transmission C and the ON/OFF of the lockup clutch 1 in response to the data inputted. The automatic transmission electronic control unit 25 is further stored in advance on the basis of the throttle opening with the line pressures of the oil pressure control unit 26 in a state for setting a predetermined gear stage or in the course of a speed change between the gear stages, so that a control is made to set a line pressure according to the running state.

Figure 3:
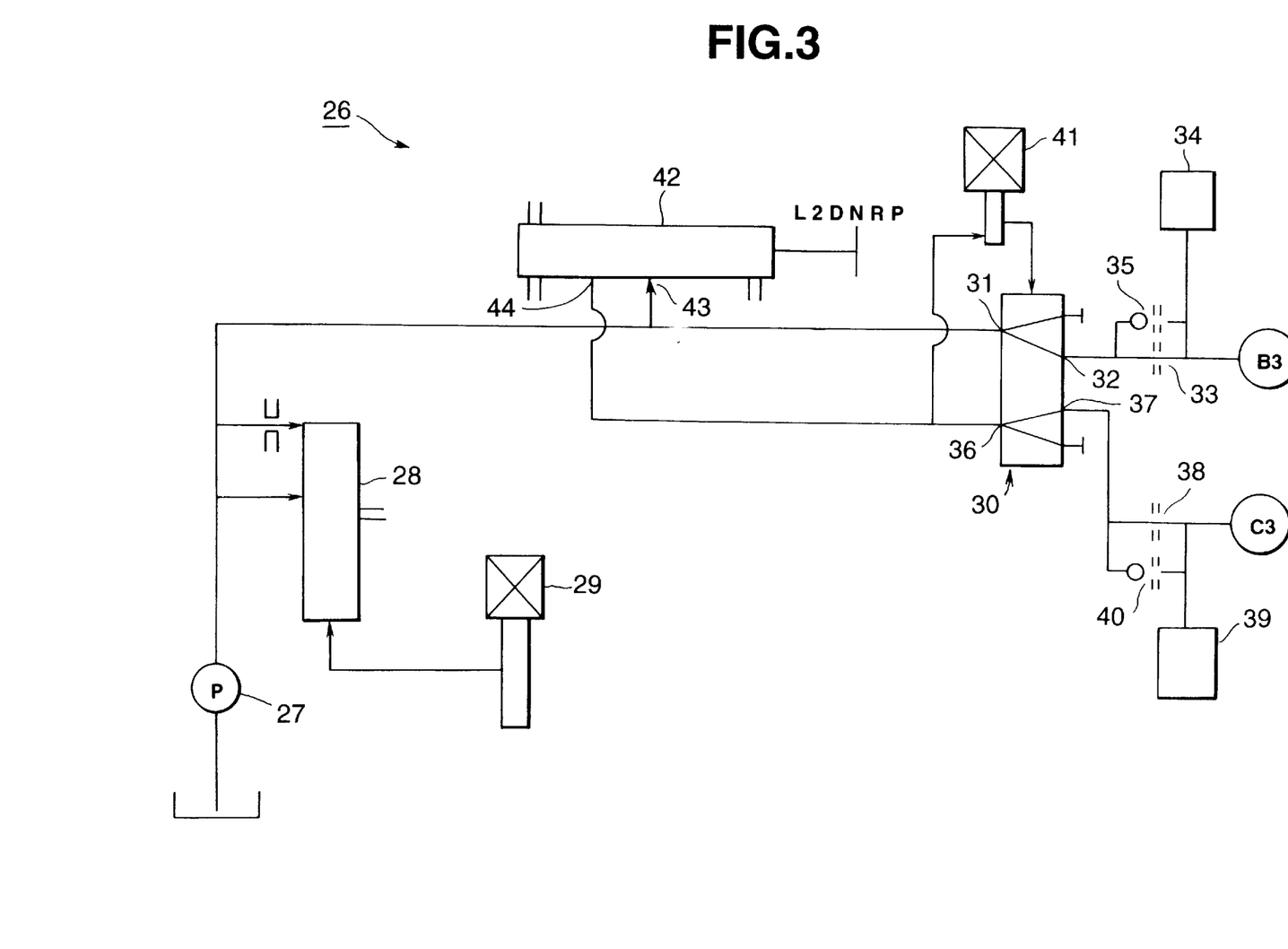
FIG. 3 is a schematic diagram showing an essential portion of an oil pressure control system to be used for controlling the automatic transmission of FIG. 1.

FIG. 3 is a schematic diagram showing such a portion of the hydraulic system of the oil pressure control unit 26 as corresponds to the third clutch C3 for setting a fourth speed of the automatic transmission C and the third brake B3 for setting a third speed. An oil pump 27 is integrated with the pump impeller of the torque converter 2 and is driven by the engine A.

The oil pressure, as outputted from the oil pump 27, is regulated to the line pressure by a primary regulator valve 28 acting as a pressure regulating valve. This primary regulator valve 28 is of the known structure having a spring, a spool, a feedback port and a control port. With the control port, there is connected a linear solenoid valve 29 for controlling the line pressure. Specifically, the pressure regulating level of the primary regulator valve 28 is changed by the signal pressure, as outputted from the linear solenoid valve 29, so that the line pressure is controlled to a predetermined pressure.

The linear solenoid valve 29 is controlled by the automatic transmission electronic control unit 25 to output a signal pressure according to a duty ratio. The linear solenoid valve 29, as used in this embodiment, is of the normal open type so that it is controlled to raise the output pressure gradually according to the increase in the throttle opening. The signal pressure of the linear solenoid valve 29 rises for a large throttle opening. As a result, the oil pressure to be inputted from the linear solenoid valve 29 to the control port of the primary regular valve 28 rises to raise the line pressure to be outputted from the primary regular valve 28.

Moreover, the primary regular valve 28 is connected with a line pressure input port 31 of a 3–4 shift valve 30 to be switched at the shifting time between the third speed and the fourth speed. This 3–4 shift valve 30 is of the known structure having a spring, a spool and a control port. A brake port 32 to be selectively opened to communicate with the line pressure input port 31 is opened to communicate with the third brake B3 and an accumulator 34 through an orifice 33. In parallel with this orifice 33, on the other hand, there is formed an orifice 35 having a check ball, which is opened when the third brake B3 is released.

Moreover, the 3–4 shift valve 30 is provided with a D-range pressure input port 36 and a clutch port 37 to be selectively opened to communicate with the D-range pressure input port 36. The clutch port 37 is connected through an orifice 38 with the third clutch C3 and an accumulator 39. In parallel with the orifice 38, on the other hand, there is arranged an orifice 40 having a check ball, which is opened when the third clutch C3 is released.

With the control port and the D-range pressure input port 36 of the 3–4 shift valve 30 thus constructed, there is connected a solenoid valve 41 which is turned ON/OFF to control the 3–4 shift valve 30. Incidentally, the solenoid valve 41 is controlled by the automatic transmission electronic control unit 25.

On the other hand, a manual valve 42 to be switched by operating the shift lever is provided with an input port 43 and an output port 44. The input port 43 is connected with the primary regulator valve 28 and the line pressure input port 31, and the output port 44 is connected with the D-range pressure input port 36 and the solenoid valve 41. The manual valve 42 thus constructed outputs or stops the oil pressure from its output port in response to one of the individual positions including the P, R, N, D, "2" and L ranges. Incidentally, the signal pressure is outputted in all the forward ranges from the D-range pressure output port 44.

Figure 4:
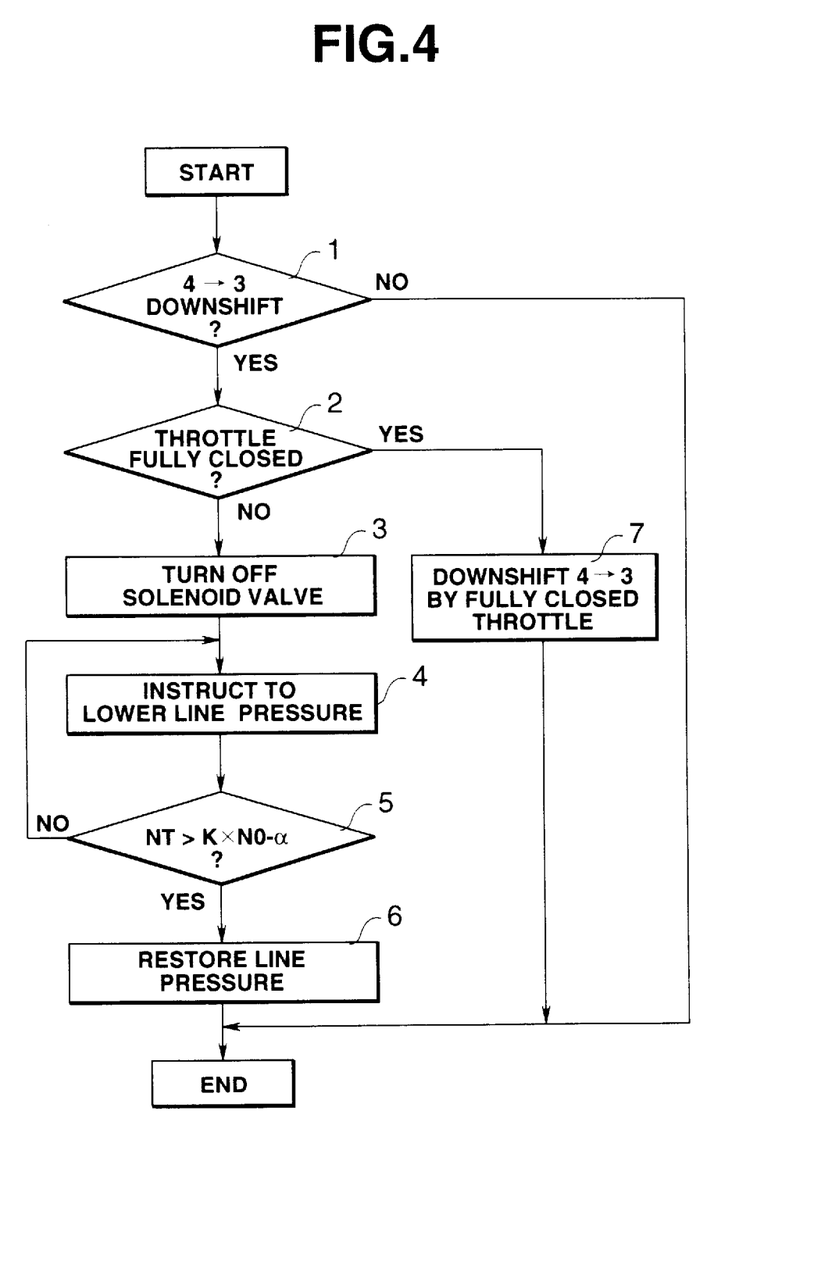
FIG. 4 is a flow chart showing a control routine of the case in which a downshift is to be made in the present invention.

FIG. 4 conceptionally shows such a control routine of the oil pressure control unit 26 as is to be followed when the automatic transmission C is downshifted from the fourth speed to the third speed. First of all, when the automatic transmission C is set at the fourth speed in the D-range, the solenoid valve 41 is ON so that its signal pressure is fed to the control port of the 3–4 shift valve 30.

In this state, the brake port 32 is opened to communicate with the drain port so that the third brake B3 is released and opened. Moreover, the D- range pressure input port 36 and the clutch port 37 are opened to communicate with each other so that the D-range pressure, as outputted from the manual valve 42, is fed to apply the third clutch C3 (as shown in FIG. 2).

Then, the running state of the vehicle, that is, whether or not the automatic transmission is to be downshifted from the fourth speed to the third speed is decided (at Step 1) on the basis of the throttle opening or the vehicle speed, for example. If the answer of Step 1 is "NO", or if the fourth speed is to be kept, this control routine is ended.

If the answer of Step 1 is "YES", it is decided (at Step 2) whether or not the accelerator is fully closed. In other words, it is decided whether or not the throttle opening is fully closed. If the answer of Step 2 is "NO", that is, if the vehicle is power-ON with the accelerator is depressed, the solenoid valve 41 is turned OFF (at Step 3), and the control signal for lowering the line pressure is inputted (at Step 4) to the oil pressure control unit 26. In other words, the line pressure is preset according to the throttle opening, but the line pressure is controlled (at Step 4 to a level lower than that of the preset line pressure. This lowering control is achieved by increasing the duty ratio of the linear solenoid valve 29 to a value larger than a preset value thereby to lower the output pressure.

After the controls of Step 3 and Step 4, the clutch port 37 is opened to communicate with the drain port so that third clutch C3 is released. At the same time, the line pressure input port 31 and the brake port 32 of the shift valve 30 are opened to communicate with each other so that the line pressure is fed to apply the third brake B3 thereby to start the downshift from the fourth speed to the third speed.

When the downshift from the fourth speed to the third speed is thus started, the turbine RPM NT of the automatic transmission C is compared with the value α which is calculated by subtracting a predetermined value α from a product of the output RPM NO of the automatic transmission C and a low-speed gear ratio K, and it is decided (at Step 5) depending upon whether or not (NT>K×NO−α) that the vehicle is immediately before the end of the downshift.

If the answer of Step 5 is "NO", the routine is returned to Step 4. If the Step 5 is "YES", the line pressure restores (at Step 6) the value which is preset according to the throttle opening, by returning the duty ratio of the linear solenoid valve 29 to a preset value. After this, the one-way clutch F2 is applied, and the turbine RPM NT reaches the synchronous RPM of the third speed so that the downshift is ended.

Incidentally, if the answer of Step 2 is "YES", that is, if the vehicle is for a coasting downshift, the third clutch C3 is released with the line pressure being kept at the preset level in response to the fully closed throttle, and the third brake B3 is applied to start the downshift from the fourth speed to the third speed (at Step 7). In accordance with this, the one-way clutch F2 is applied to end the downshift, and the control routine is left. Steps 1 and 2 correspond to downshift detecting means of the present invention; Step 4 corresponds to line pressure lowering means of the present invention invention; and Step 6 corresponds to line pressure restoring means of the present invention.

Figure 5:
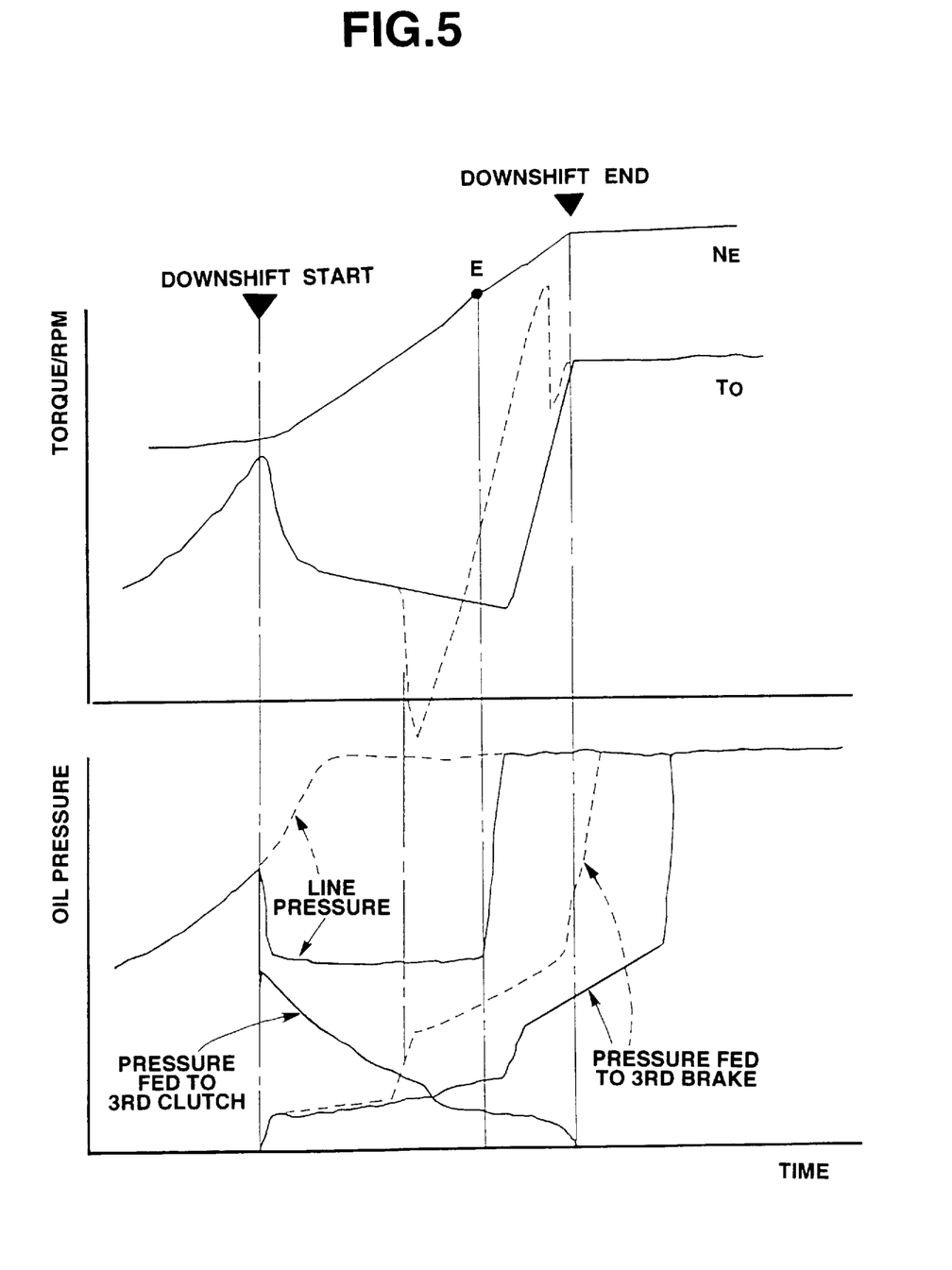
FIG. 5 is a characteristic diagram plotting examples of the changes in the engine RPM, the output torque of the automatic transmission and the oil pressure of an oil pressure control system in the control routine of FIG. 4.

FIG. 5 is a characteristic diagram plotting examples of the specific changes in the engine RPM NE at the downshift from the fourth speed to the third speed in the control routine of FIG. 4, in the output torque TO of the automatic transmission C, in the oil pressure (e.g., the line pressure) of the oil pressure control unit 26, in the application pressure of the third clutch C3 and in the application pressure of the third brake B3. In FIG. 5, dotted curves plot the control example of the prior art, and solid curves plot the control example of the present invention.

In the control of the prior art, first of all, the line pressure is set, even after the downshift start, to respond to the increase in the throttle opening. After this, the line pressure is raised and then controlled to a constant level as the throttle opening becomes constant. As a result, the pressure to be fed to the third clutch for setting the fourth speed drops to release the third clutch, whereas the oil pressure is fed to the third brake for setting the third speed so that the application of the third brake is started. At the instant when the downshift comes to its halfway, the pressure to be fed to the third brake arises.

As a result, before the input RPM reaches the synchronous value for the third speed, the third brake for setting the third speed takes a torque capacity larger than necessary. Then, the output torque may drastically and abruptly drop to produce a shift shock thereby to lower the riding comfort.

According to the embodiment of the present invention, on the contrary, the line pressure drops to a level lower than a set value, as indicated by a solid curve, simultaneously with the start of the downshift. Specifically, the line pressure is controlled to a substantially constant level lower than that of the oil pressure at the downshift start so that the feed rate of the oil pressure to the third brake B3 for setting the third speed is lower than that of the prior art. The control is continued to cause the line pressure to restore the set level at an instant E immediately before the downshift end. As a result, the third clutch C3, as having set the fourth speed, is released, and the one-way clutch F2 is applied to end the downshift. After this, the third brake B3 for setting the third speed is applied.

As a result, in the case of the kickdown from the fourth speed to the third speed, the application pressure, i.e., the torque capacity of the third clutch C3 can be prevented from overcoming a predetermined value before the turbine RPM of the automatic transmission C reaches the synchronous of the third speed in the course of the downshift, thereby to suppress the change in the output torque. This results in an effect that the shift shock can be prevented to stabilize the drive force of the vehicle thereby to improve the riding comfort.

In the aforementioned embodiment, moreover, the line pressure to be fed to the third brake B3 is lowered by controlling the duty ratio of the linear solenoid valve 29. In the case of the downshift from the fourth speed to the third speed under another running condition, therefore, the time lag at the downshift can be eliminated by setting the line pressure at a level according to the running condition. When the driver turns off the overdrive switch in the set state of the fourth speed so as to effect the engine braking at the third speed, for example, the downshift from the fourth speed to the third speed is quickened to improve the shifting characteristics.

In this embodiment, the application of the third clutch C3 is delayed from that of the prior art, but the third speed is set by applying the one-way clutch F2 so that the shift is not delayed but the output torque after the shift end is sufficed. Moreover, the control to lower the line pressure is executed at a stage before the end of the downshift. This stage is approximate to the neutral state, because a rotational change occurs in the automatic transmission C so that no torque is outputted to the outside. As a result, the output torque is not influenced by the application/release of the frictional engagement elements so that it will not change even if the line pressure is lowered.

In this embodiment, moreover, the control to be made before the end of the downshift is to cause the line pressure to restore so that the torque capacities to be shared among the clutches and brakes for setting the third speed can be kept at proper values. As a result, the frictional engagement elements, i.e., the clutches and brakes can be prevented from slipping and wearing, to improve their durabilities.

Incidentally, the restoration timing of the line pressure could be determined on the basis of the RPMs of the members of the automatic transmission C or the RPM of the engine A. The restoration timing could also be determined by the timer control although the control accuracy more or less drops.

Moreover, the present invention can also be applied to the speed change control of an automatic transmission in which the downshift is made by the so- called "clutch-to-clutch shift". In this modification, the shift to the third speed can be executed without inviting the overshoot of the engine A, by completing the restoration control of the line pressure immediately before the establishment of the third speed. Moreover, the slippage of the third brake B3 can naturally be prevented.

If the control to lower the line pressure is made simultaneously with the decision of the downshift, still moreover, the response delay of the oil pressure can be prevented to switch the gear stage promptly. In addition, the present invention can be applied to an automatic transmission for a vehicle employing not the engine but an electric motor as its prime mover, or a speed change control system for an automatic transmission of a vehicle employing an engine and a motor as its prime mover.

Here will be synthetically described the advantages to be obtained by the present invention. According to the speed change control system of the present invention, at the time of a downshift of the automatic transmission, as is to be made by releasing the frictional engagement elements for setting a higher speed gear stage and by applying the frictional engagement elements for setting a lower speed gear stage, the line pressure to be fed to the frictional engagement elements for setting the lower speed gear stage is controlled to a level lower than that which is set according to the throttle opening, so that both the frictional engagement elements having set the higher speed gear stage and the frictional engagement element for setting the lower speed gear stage can be prevented from having torque capacities higher than predetermined values. As a result, the fluctuation of the output torque in the course of the speed change can be made gentle to lighten the shift shock thereby to stabilize the drive force and improve the riding comfort.

Since the line pressure is controlled according to the throttle opening, moreover, it is set to a value according to the running conditions when the downshift is made from the fourth speed to the third speed is made under other running conditions, so that the time lag at the downshift can be prevented while improving the speed change characteristics.

According to the present invention, still moreover, the line pressure may be controlled during the downshift to a level lower than that which is determined on the basis of the throttle opening, but is made to restore the oil pressure according to the original throttle opening before the end of the downshift, so that the frictional engagement elements for achieving the lower speed gear stage at the end of the downshift are given the torque capacities according to the throttle opening. As a result, the frictional engagement elements can be prevented from slipping after the downshift, to improve their durabilities.

What is claimed is:

1. A speed change control system for an automatic transmission for making a speed change by applying/releasing frictional engagement elements and for controlling a line pressure to be fed to said frictional engagement elements, to a pressure which is predetermined according to a load upon a prime mover, comprising:

a shift valve which is operative to apply a frictional engagement element during a downshift of said automatic transmission by controlling a feed of the line pressure to the frictional engagement element;

downshift detecting means for detecting a downshift of said automatic transmission with an output of the prime mover being augmented; and line pressure lowering means for controlling said line pressure to a level lower than the pressure, as determined according to said load, if said downshift is detected by said downshift detecting means.

2. A speed change control system according to claim 1, wherein said line pressure lowering means includes a pressure regulator valve, and a solenoid valve for changing the pressure regulating level by outputting a signal pressure to said pressure regular valve.

3. A speed change control system according to claim 1, wherein said frictional engagement elements include a one-way clutch to be applied at said downshift in a power ON state, and a multi-disc type brake arranged in parallel with said one-way clutch.

4. A speed change control system according to claim 1, further comprising:

line pressure restoring means for causing the line pressure, as lowered by said line pressure lowering means, to restore the pressure according to said load before the end of said downshift.

5. A speed change control system according to claim 4, further comprising:

means for deciding the end of said downshift on the basis of the RPM of a rotary member of said automatic transmission.

6. A speed change control system according to claim 4, further comprising:

means for deciding the end of said downshift on the basis of the elapsed time from the start of said downshift.

7. A speed change control system according to claim 4, wherein said prime mover includes an engine for increasing its output according to a throttle opening.

8. A speed change control system according to claim 1, wherein said prime mover includes an engine for increasing its output according to a throttle opening.

* * * * *

UNITED STATES PATENT AND TRADEMARK OFFICE
CERTIFICATE OF CORRECTION

PATENT NO. : 5,842,951

DATED : 12-01-98

INVENTOR(S): Hideki Yasue, et al

It is certified that an error appears in the above-identified patent and that said Letters Patent is hereby corrected as shown below:

```
Item [75]
```
On cover page please change the name of the inventor "Kumura" to "Kimura".

Signed and Sealed this

Thirtieth Day of May, 2000

*Attest:*

Q. TODD DICKINSON

*Attesting Officer*  *Director of Patents and Trademarks*